United States Patent [19]

Milford, Jr.

[11] Patent Number: 4,551,549

[45] Date of Patent: Nov. 5, 1985

[54] PREPARATION AND USE OF NITROTEREPHTHALAMIC ACIDS

[75] Inventor: George N. Milford, Jr., Waynesboro, Va.

[73] Assignee: E. I. Du Pont de Nemours and Company, Wilmington, Del.

[21] Appl. No.: 485,942

[22] Filed: Apr. 18, 1983

Related U.S. Application Data

[62] Division of Ser. No. 293,329, Aug. 17, 1981, Pat. No. 4,399,303.

[51] Int. Cl.[4] ........................................... C07C 102/06
[52] U.S. Cl. .................................. 562/437; 562/458; 564/134
[58] Field of Search ................ 562/437, 442; 564/134, 564/156

[56] References Cited

U.S. PATENT DOCUMENTS

| | | | |
|---|---|---|---|
| 3,389,166 | 6/1968 | Loev | 564/156 |
| 3,892,797 | 7/1975 | Gengnagel | 560/22 |
| 3,931,210 | 1/1976 | Zengel et al. | 562/442 |
| 4,069,248 | 1/1978 | Wanderwerff | 564/156 |

OTHER PUBLICATIONS

*Chemical Abstracts,* vol. 84, Abstract No. 164495a, (1976), Hirose et al.

*Primary Examiner*—Natalie Trousof
*Assistant Examiner*—Patricia M. Scott

[57] ABSTRACT

2- and 3-Nitroterephthalamic acids are prepared by ammonolysis of dialkyl nitroterephthalates. The terephthalamic acids are useful as intermediates in the preparation of difunctional compounds useful in the preparation of aromatic polyamides and polybenzimidazoles.

3 Claims, No Drawings

PREPARATION AND USE OF NITROTEREPHTHALAMIC ACIDS

This application is a divisional application of application Ser. No. 293,329 filed Aug. 17, 1981, now U.S. Pat. No. 4,399,303.

This invention relates to 2- and 3-nitroterephthalamic acids and a process for their preparation and also a process for the preparation of 3,4-diaminobenzoic acids starting from 3-nitroterephthalamic acid.

3,4-diaminobenzoic acid is an intermediate for the preparation of poly[2,5(6)-benzimidazole], a polymer having excellent high temperature properties and resistance to acid hydrolysis. Known methods of preparing 3,4-diaminobenzoic acid include acetylation of p-aminobenzoic acid followed by nitration, removal of the acetyl group and reduction of the nitro group to amine. Alternatively, p-chlorobenzoic may be nitrated, the chloro group replaced by amine by reaction with ammonia under pressure and the nitro group reduced to amine. A more direct and lower cost route to 3,4-diaminobenzoic acid would provide lower cost poly[2,5(6)-benzimidazole].

This invention provides a new and improved process for the preparation of 3-nitroterephthalamic acid which is useful in the preparation of 3,4-diaminobenzoic acid which in turn can be used to prepare high molecular poly[2,5(6)-benzimidazole], a polymer useful in the preparation of high temperature resistant fibers and film.

BRIEF DESCRIPTION OF THE INVENTION

This invention provides as new compositions of matter 2- and 3-nitroterephthalamic acids. This invention further provides a new process for the preparation of 2- and 3-nitroterephthalamic acids comprising the steps of reaction of a 1-4 carbon dialkyl nitroterephthalate with 20-51% by weight aqueous ammonia at 100°-200° C. under at least autogenous pressure for 1-6 hours at a dialkyl nitroterephthalate concentration of 10-40% by weight. Preferably 30-51% by weight aqueous ammonia is reacted at 150°-175° C. for 2-4 hours. For the preparation of 3-nitroterephthalamic acid it is preferred that the reaction be carried out using 20% by weight dimethyl nitroterephthalate and 25-51% by weight aqueous ammonia for 2-4 hours at 125°-175° C., most preferably at 150° C. 3-Nitroterephthalamic acid is isolated from the reaction mixture by cooling, removal of by-product nitroterephthalamide by filtration, adjustment of the pH of the filtrate to about 4 and removal of 3-nitroterephthalamic acid by filtration. For the preparation of 2-nitroterephthalamic acid, it is preferred that the reaction be carried out using about 10% by weight dimethyl nitroterephthalate and 25-51% by weight aqueous ammonia for 2-4 hours at 150°-200° C., most preferably at 175° C. 2-Nitroterephthalamic acid is isolated from the reaction mixture by cooling, removal of by-product nitroterephthalamide by filtration, adjusting the pH of the filtrate to about 4, removal of by-product 3-nitroterephthalamic acid by filtration, adjustment of the pH of the filtrate to about 2 and removing 2-nitroterephthalamic acid by filtration. The reaction may be summarized as follows:

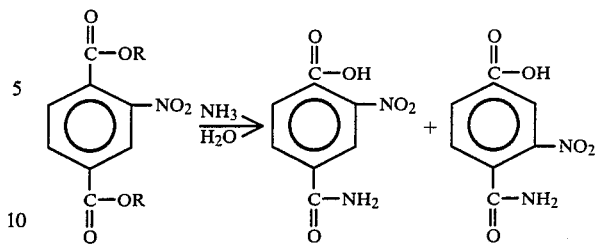

This invention also provides a process for the preparation of 3,4-diaminobenzoic acid by reaction of 3-nitroterephthalamic acid with alkali metal hypochlorite at 60°-100° C. for 15-60 minutes followed by reduction of the nitro group to amine by conventional methods. Preferably excess alkali metal hypochlorite is used. Most preferably the alkali metal hypochlorite is sodium hypochlorite.

DETAILED DESCRIPTION OF THE INVENTION

Dimethyl nitroterephthalate can be prepared in greater than 95% yield by nitration of readily available dimethyl terephthalate. Ammonolysis-hydrolysis of dimethyl nitroterephthalate can provide about 70% or higher yields of either 2- or 3-nitroterephthalamic acid depending on reaction conditions. Hofmann degradation of 3-nitroterephthalamic acid provides up to 90% or higher yields of 3-nitro-4-aminobenzoic acid which can be reduced to 3,4-diaminobenzoic acid in 80-85% yields by conventional methods.

EXAMPLE 1

Ammonolysis-hydrolysis of dimethyl nitroterephthalate ($NO_2DMT$) is carried out in a stirred pressure vessel under the conditions indicated in Table I. 29% by weight aqueous ammonia is first added to the reaction vessel followed by either water or liquid ammonia to achieve the desired weight percent $NH_3$ before addition of solid reactant. The solid reactant is then added in an amount to provide the indicated percent solid reactant in the total mixture. After completion of the reaction, the mixture is cooled, excess ammonia is removed under reduced pressure and the volume is adjusted to 500 ml. The mixture is filtered to remove by-product nitroterephthalamide ($NO_2TAm$), the pH is adjusted to about 4 and 3-nitroterephthalamic acid is removed by filtration, the pH of the filtrate is adjusted to about 2 and 2-nitroterephthalamic acid is removed by filtration.

3-Nitroterephthalamic acid is purified by removing impurities by extraction with boiling water four times, melting point 277° C. Elemental analysis gives C-44.86, H-2.84, N-12.74 and O-37.50, calculated C-45.72, H-2.88, N-13.33, O-38.07. Equivalent weight=213 vs. 210.2 calculated.

2-Nitroterephthalamic acid has a melting point of 245° C. Equivalent weight is 215 vs. 210.2 calculated. 2-Nitroterephthalamic acid may be used to prepare 2-nitro-4-aminobenzoic acid and 2,4-diaminobenzoic acid, both of which can be used to prepare aromatic polyamides useful in fiber and film.

EXAMPLE 2

Hofmann degradation of 3-nitroterephthalamic acid is carried out in a stirred reaction vessel. Conditions and yields of 3-nitro-4-aminobenzoic acid product are summarized in Table II. Highest yields of 3-nitro-4-aminobenzoic acid appear to be obtained at 80°-90° C. at about 20:1 liquid:solids using 10% excess hypochlorite.

EXAMPLE 3

Reduction of 3-nitro-4-aminobenzoic acid to 3,4-diaminobenzoic acid may be carried out by conventional methods. Reduction of 3-nitro-4-aminobenzoic acid with tin and hydrochloric acid gave 3,4-diaminobenzoic acid in 73.5% yield.

TABLE I
REACTION OF DIMETHYL 2-NITROTEREPHTHALATE WITH AQUEOUS AMMONIA

| | | | | | Yield | | |
|---|---|---|---|---|---|---|---|
| Run | % NH$_3$ | % Solids (NO$_2$DMT) | Time (hours) | Temp. °C. | NO$_2$TAm % | 3-nitro terephthalamic acid, % | 2-nitro terephthalamic acid, % |
| 1 | 29 | 7.7 | 1 | 100 | 52.5 | 26.2 | 16.5 |
| 2 | 29 | 7.7 | 6 | 100 | 25.6 | 50.5 | 23.9 |
| 3 | 29 | 6.2* | 2 | 150 | 0 | 80.0 | 15.4 |
| 4 | 29 | 7.7 | 2 | 150 | 0 | 63.8 | — |
| 5 | 29 | 7.7 | 0.5 | 150 | 9.1 | 48.6 | — |
| 6 | 13.7 | 7.3 | 1 | 150 | 0 | 36.0 | 48.6 |
| 7 | 2.5 | 7.0 | 1 | 150 | 0 | 60.0 | 32.2 |
| 8 | 29 | 14.3 | 4 | 125 | 5.7 | 43.8 | — |
| 9 | 51 | 14.5 | 3 | 125 | 50.4 | — | — |
| 10 | 51 | 14.5 | 3 | 150 | 19.1 | 66.7 | — |
| 11 | 51 | 14.5 | 5 | 150 | 1.3 | 59.0 | — |
| 12 | 29 | 20 | 1 | 150 | 12.3 | 61.7 | 21.5 |
| 13 | 29 | 20 | 2 | 150 | 0 | 62.4 | 35.0 |
| 14 | 51 | 20.3 | 2 | 150 | 30.6 | 57.5 | — |
| 15 | 51 | 20.3 | 3 | 150 | 10.4 | 75.0 | 10.0 |
| 16 | 76.9 | 20.7 | 3 | 140 | 76.8 | — | — |
| 17 | 29 | 20 | 3 | 150 | 0 | 56.3 | 8.3 |
| 18 | 36 | 20 | 3 | 150 | 2.9 | 54.0 | — |
| 19 | 43 | 20 | 3 | 150 | 12.5 | 77.4 | 0 |
| 20 | 50 | 20 | 3 | 150 | 23.5 | 53.5 | — |
| 21 | 57 | 20 | 3 | 150 | 37.6 | 38.5 | 5.0 |
| 22 | 64 | 20 | 3 | 150 | 55.1 | 29.8 | 2.6 |
| 23 | 43 | 30 | 3 | 150 | 11.3 | 56.3 | 15.5 |
| 24 | 43 | 40 | 3 | 150 | 4.5 | 66.0 | 20.1 |
| 25 | 43 | 50 | 3 | 150 | 10.7 | 56.4 | 26.3 |
| 26 | 43 | 20 | 2 | 150 | 19.8 | 72.5 | 8.6 |
| 27 | 43 | 20 | 3 | 130 | 30.7 | 46.1 | 7.2 |
| 28 | 43 | 20 | 4 | 150 | 0 | 69.3 | 16.9 |
| 29 | 43 | 10.7 | 2 | 175 | 5.2 | 58.6 | — |
| 30 | 43 | 10.7 | 2 | 150 | 5.5 | 63.3 | 5.0 |
| 31 | 43 | 20 | 3 | 150 | 8.0 | 71.0 | 6.0 |
| 32 | 43 | 10.7 | 2 | 175 | 5.2 | 0 | 68.4 |
| 33 | 43 | 10.7 | 2 | 150 | 5.5 | 53.4 | 36.0 |
| 34 | 43 | 20 | 3 | 150 | 8.0 | 71.0 | 6.0 |

*NO$_2$TAm

TABLE II
HOFMANN DEGRADATION OF 3-NITROTEREPHTHALAMIC ACID

| Run-Condition | Temp. °C. | Time (minutes) | 3-nitro-4-aminobenzoic acid, % yield |
|---|---|---|---|
| 1-A | 60 | 15 | 50 |
| 2-B | 60 | 15 | 44 |
| 3-A | 60 | 30 | 67 |
| 4-B | 60 | 30 | 64 |
| 5-A | 60 | 60 | 83 |
| 6-B | 60 | 60 | 78 |
| 7-A | 70 | 15 | 78 |
| 8-B | 70 | 15 | 81 |
| 9-A | 80 | 15 | 83 |
| 10-B | 80 | 15 | 92 |
| 11-A | 90 | 15 | 81 |
| 12-B | 90 | 15 | 89 |
| 13-A | 90 | 30 | Lost |
| 14-B | 90 | 30 | 89 |
| 15-A | 90 | 60 | 89 |
| 16-B | 90 | 60 | 86 |
| 17-A | 100 | 15 | 83 |
| 18-B | 100 | 15 | 89 |

TABLE II-continued
HOFMANN DEGRADATION OF 3-NITROTEREPHTHALAMIC ACID

| Run-Condition | Temp. °C. | Time (minutes) | 3-nitro-4-aminobenzoic acid, % yield |
|---|---|---|---|
| 19-C | 90 | 15 | 81 |
| 20-C | 90 | 60 | 76 |
| 21-D | 90 | 15 | 81 |
| 22-D | 90 | 60 | 70 |
| 23-E | 90 | 15 | 78 |
| 24-F | 90 | 15 | 81 |

A—5 moles NaOH + 1 mol Cl$_2$/mol 3-nitroterephthalamic acid; 20:1 liquid:acid.
B—5.5 moles NaOH + 1.1 mol Cl$_2$/mol 3-nitroterephthalamic acid; 20:1 liquid:acid.
C—5 moles NaOH + 1 mol Cl$_2$/mol 3-nitroterephthalamic acid; 10:1 liquid:acid.
D—5.5 moles NaOH + 1.1 mol Cl$_2$/mol 3-nitroterephthalamic acid; 10:1 liquid:acid.
E—same as C except 40:1 liquid:acid
F—same as D except 40:1 liquid:acid

I claim:

1. Process for the preparation of nitroterephthalamic acids by reaction of 1-4 carbon dialkyl nitroterephthalate with 20-51% by weight aqueous ammonia under at least autogenous pressure at 100°-200° C. for 1-6 hours at a dialkyl nitroterephthalate concentration of 10-40% by weight.

2. Process of claim 1 wherein 30-51% by weight aqueous ammonia is used and the reaction carried out for 2-4 hours at 150°-175° C.

3. Process of claim 1 wherein 3-nitroterephthalamic acid is prepared by reaction of a 1-4 carbon dialkyl nitroterephthalate at a concentration of 20% by weight with 25-51% by weight aqueous ammonia under at least autogenous pressure at 150° C., for 2-4 hours, cooling the mixture to room temperature, filtering to remove by-product nitroterephthalamide, adjusting the pH of the filtrate to about 4 and removal of 3-nitroterephthalamic acid by filtration.

* * * * *